United States Patent
Woelfling (10) Patent No.: US 10,641,301 B2
(45) Date of Patent: May 5, 2020

(54) BICYCLE MOUNT DEVICE AND METHOD

(71) Applicant: Robert Joseph Woelfling, Pilesgrove, IL (US)

(72) Inventor: Robert Joseph Woelfling, Pilesgrove, IL (US)

(*) Notice: Subject to any disclaimer, the term of this patent is extended or adjusted under 35 U.S.C. 154(b) by 603 days.

(21) Appl. No.: 15/479,506

(22) Filed: Apr. 5, 2017

(65) Prior Publication Data
US 2018/0291936 A1 Oct. 11, 2018

(51) Int. Cl.
*F16B 2/06* (2006.01)
*B60R 9/10* (2006.01)

(52) U.S. Cl.
CPC .......... *F16B 2/065* (2013.01); *B60R 9/10* (2013.01)

(58) Field of Classification Search
CPC .... F16B 2/065; B60R 9/10; Y10T 403/32254; Y10T 403/32262; Y10T 403/32319; Y10T 403/32606; Y10T 403/32951; Y10T 403/32967; B62H 3/00; B62H 3/02; B62H 2700/00; B62H 2700/005; Y10S 224/924; B25H 1/0014
See application file for complete search history.

(56) References Cited

U.S. PATENT DOCUMENTS

| | | | | |
|---|---|---|---|---|
| 5,108,018 A * | 4/1992 | Spinka | ...... | B60R 9/06 224/506 |
| 5,709,521 A * | 1/1998 | Glass | ...... | B60R 9/042 414/462 |
| 7,712,614 B2 * | 5/2010 | Carlson | ...... | B62H 3/02 211/22 |
| 8,556,144 B2 * | 10/2013 | Liu | ...... | B60R 9/08 224/497 |
| 9,358,933 B2 * | 6/2016 | Phillips | ...... | B60R 9/10 |
| 10,166,932 B2 * | 1/2019 | Woelfling | ...... | B60R 9/06 |
| 2019/0106062 A1 * | 4/2019 | Olsen | ...... | B60R 9/06 |

* cited by examiner

*Primary Examiner* — Jonathan P Masinick
(74) *Attorney, Agent, or Firm* — Saxton & Stump, LLC.

(57) ABSTRACT

A device and method for mounting a bicycle to a bicycle rack. The device includes an attachment member and a mount rail. The attachment member is used to attach the device to a seat post or frame of the bicycle. The attachment member has a securing section and a mount rail receiving section, with the securing section securing the attachment member to the seat post or frame. The mount rail has a bicycle rack mounting section and an attaching section. The mounting section is configured to cooperate with a bicycle rack and the attaching section is configured to cooperate with the mount rail receiving section to removably and pivotally secure the mount rail to the mount rail receiving section of the attachment member.

20 Claims, 5 Drawing Sheets

FIG. 8

BICYCLE MOUNT DEVICE AND METHOD

FIELD OF THE INVENTION

The present invention is directed to a device and method for positioning a bicycle on a bicycle rack. In particular, the invention is directed to a device and method which positions and maintains the bicycle in a level position.

BACKGROUND OF THE INVENTION

A bicycle car rack is a common means of transporting bicycles on a vehicle. Typically, such racks utilize the vehicle's existing trailer hitch receiver as an attachment point. Such known standard racks properly support a "man's" bike, with the horizontal cross bar from the seat post to the handlebar stem, providing safety and convenience for the rider. However, known racks do not properly support a "girl's" or "lady's" bike, which do not have the horizontal cross bar, but rather a double parallel tube design to provide the needed strength for the frame. Known racks also do not properly support "unisex" bikes, which not have a horizontal crossbar but a higher parallel tube design between the traditional "man's" and "lady's" styles. The design of the "lady's" and "unisex" bikes do not allow the bike to properly hang from the traditional bike rack which generally employs some sort of double hook arrangement.

As bicycles, other than the traditional "man's" bike, do not have horizontal cross bars, such bicycles can present safety issues when trying to carry them on known traditional vehicle mounted bike racks, which are primarily designed to engage such horizontal cross bars. Because such bicycles do not have the horizontal cross bars, the bicycles may be mounted off center to the vehicle, causing a tire to extend beyond the side of the vehicle. Consequently, the driver of such vehicle might misjudge clearance of the vehicle and bicycle, which could result in the bicycle being knocked off of the bike rack. In addition, a pedestrian or another vehicle could be hit by the bike, causing an accident or injury.

In addition, bicycles which do not have horizontal cross bars generally are mounted on known bike racks in a non-level position. Consequently, at least one wheel of the bicycle is positioned closer to the ground. In smaller vehicles, such as economy and sports cars, which have less height than other vehicles, the lack of ground clearance of the wheel can pose a safety concern, as the wheel might well be dragging on the road surface or at least not far from it.

It would, therefore, be beneficial to provide a bicycle mount device and method which positions, secures and maintains a bicycle in a level position during transport. In addition, it would be beneficial to maintain the bicycle at a convenient height to ensure that the bicycle wheels are positioned safely above the ground for proper transport on the carrier.

SUMMARY OF THE INVENTION

An object is to provide a bicycle mount device which cooperates and mounts to a seat positioning member of a bicycle. The bicycle mount allowing for any type of bicycle, whether the bicycle has high top tube or cross-bar (sometimes referred to as a "man's" bike), a low or absent top tube or cross-bar (sometimes referred to as a "lady's" bike) or modified top tube or cross-bar (sometimes referred to as a "unisex" bike or a "cross bike"), to be positioned and maintained on the bicycle rack in a height appropriate, level position.

An object is to provide a bicycle mount device and method which allows the user to quickly and easily position and secure the bicycle to the bicycle rack.

An object is to provide a bicycle mount device where, after the initial installation of an attachment member to the seat post or frame of the bicycle, tools are not required to position and secure the bicycle to the bicycle rack.

An embodiment is directed to a device for mounting a bicycle to a bicycle rack. The device includes an attachment member and a mount rail. The attachment member is used to attach the device to a seat post or frame of the bicycle. The attachment member has a securing section and a mount rail receiving section, with the securing section securing the attachment member to the seat post or frame. The mount rail has a bicycle rack mounting section and an attaching section. The mounting section is configured to cooperate with a bicycle rack, and the attaching section is configured to cooperate with the mount rail receiving section to removably and pivotally secure the mount rail to the mount rail receiving section of the attachment member.

An embodiment is directed to a method for mounting a bicycle to a bicycle rack on a vehicle. The method includes: securing an attachment member to a seat post or frame of a bicycle; removably attaching a mount rail to the attachment member; adjusting the mount rail relative to the attachment member such that the mount rail is approximately horizontally level; and mounting the mount rail and secured bicycle to the bicycle rack such that an axis which extends through center points of both wheels of the bicycle is essentially parallel to a plane which extends through center points of wheels of the vehicle.

Other features and advantages of the present invention will be apparent from the following more detailed description of the preferred embodiment, taken in conjunction with the accompanying drawings which illustrate, by way of example, the principles of the invention.

DETAILED DESCRIPTION OF THE INVENTION

The description of illustrative embodiments according to principles of the present invention is intended to be read in connection with the accompanying drawings, which are to be considered part of the entire written description. In the description of embodiments of the invention disclosed herein, any reference to direction or orientation is merely intended for convenience of description and is not intended in any way to limit the scope of the present invention. Relative terms such as "lower," "upper," "horizontal," "vertical," "above," "below," "up," "down," "top" and "bottom" as well as derivative thereof (e.g., "horizontally," "downwardly," "upwardly," etc.) should be construed to refer to the orientation as then described or as shown in the drawing under discussion. These relative terms are for convenience of description only and do not require that the apparatus be constructed or operated in a particular orientation unless explicitly indicated as such. Terms such as "attached," "affixed," "connected," "coupled," "interconnected," and similar refer to a relationship wherein structures are secured or attached to one another either directly or indirectly through intervening structures, as well as both movable or rigid attachments or relationships, unless expressly described otherwise. Moreover, the features and benefits of the invention are illustrated by reference to the preferred embodiments. Accordingly, the invention expressly should not be limited to such preferred embodiments illustrating some possible non-limiting combination of features that may exist alone or in other combinations of features, the scope of the invention being defined by the claims appended hereto.

Figure 1:
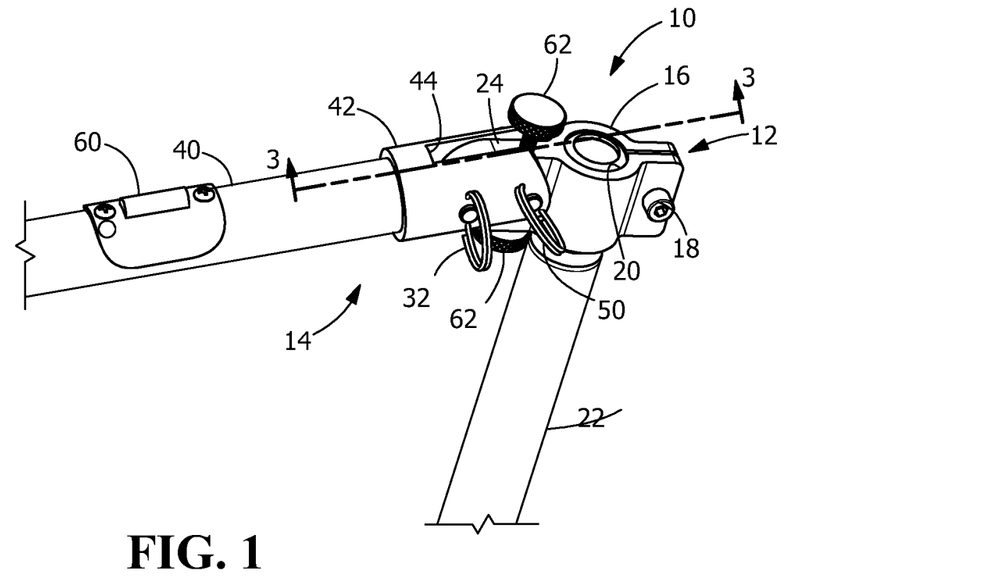
FIG. 1 is a perspective view of a first illustrative bicycle mount of the present invention mounted on a seat post of a bicycle.
Figure 2:
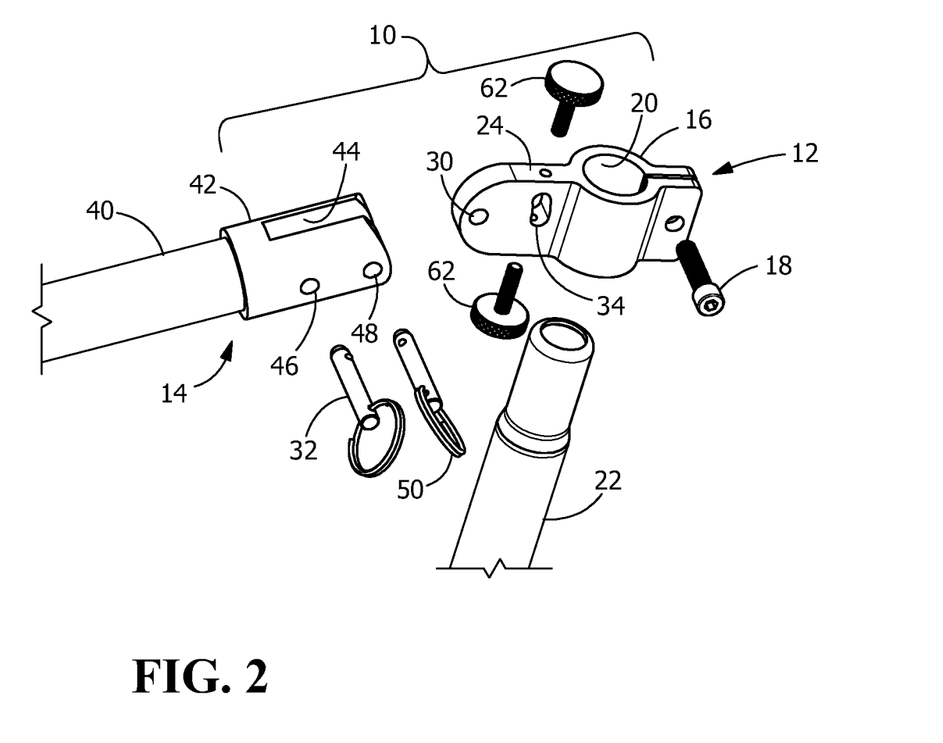
FIG. 2 is a perspective view of the bicycle mount of FIG. 1 shown with a bicycle attachment member removed from the seat post and a mount rail detached from the bicycle attachment member.
Figure 3:
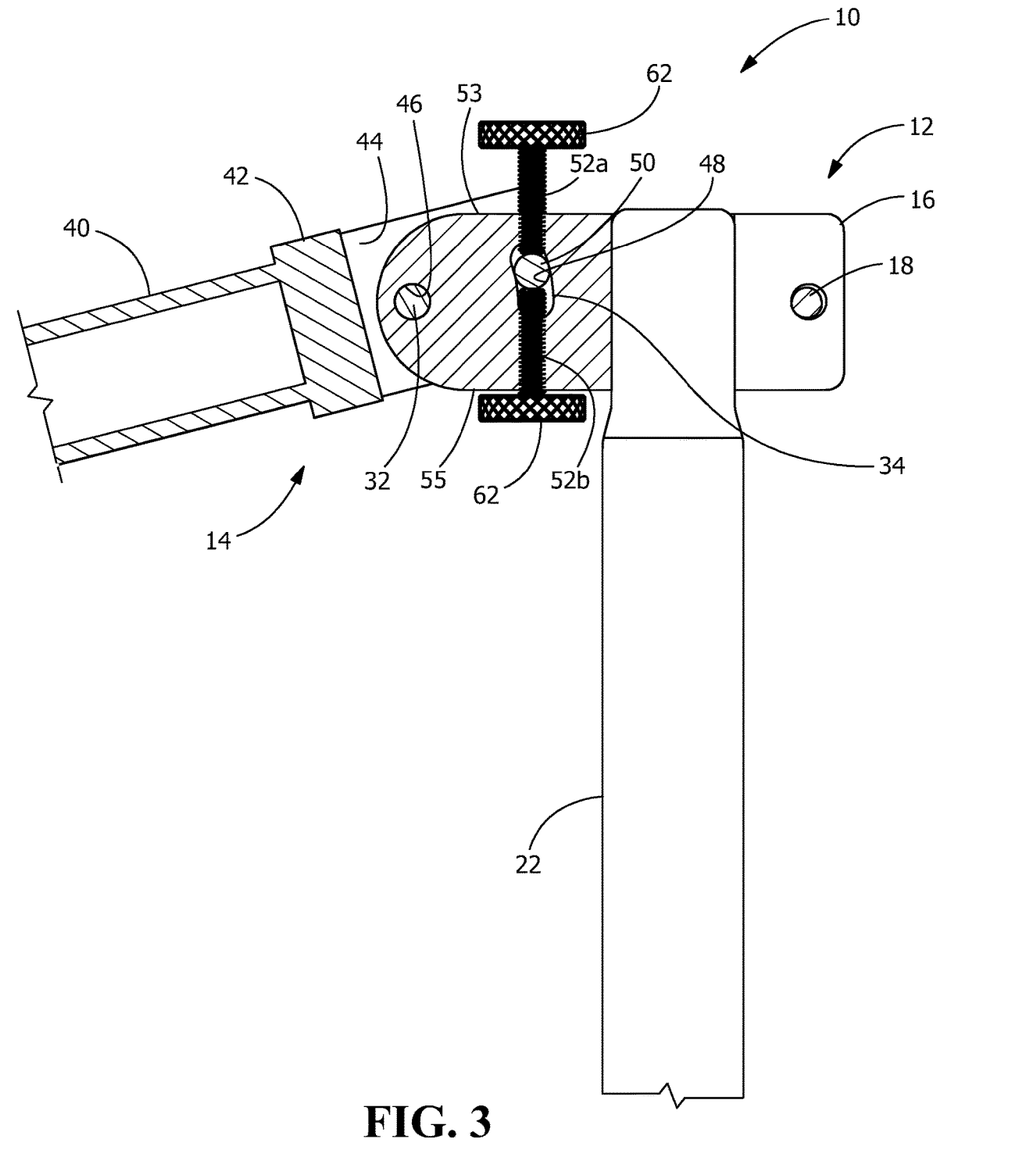
FIG. 3 is a cross-sectional view of the bicycle mount of FIG. 1 taken along line 3-3.

As shown in FIGS. 1 through 3, a first illustrative embodiment of the bicycle mount 10 has a bicycle attachment member 12 and a horizontal mount rail 14. The horizontal mount rail 14 is movably and removably mounted to the attachment member 12. The bicycle mount 10 is configured to be used with known bicycle car racks.

In the illustrative embodiment shown in FIGS. 1 through 3, the bicycle attachment member 12 has a cylindrical seat post securing or retaining section 16 with an opening 20 extending therethrough. The opening 20 is dimensioned to receive a bicycle frame or seat post 22 from a bicycle therein. In the embodiment shown, the opening 20 is dimensioned to receive a ⅞ inch to 1¼ inch diameter bicycle frame or seat post. However, the opening 20 can be configured to receive other diameter bicycle frames or seat posts without departing from the scope of the invention. In the illustrative embodiment shown, mounting hardware, such as a tightening screw 18, is used to clamp or tighten the seat post securing section 16 to the bicycle frame or seat post 22 to maintain the seat post securing section 16 in position to the bicycle frame or seat post 22. Alternatively, a set screw or other holding member may extend into the opening 20 to ensure that the bicycle frame or seat post 22 is properly maintained the opening 20. The seat post securing section 16 has a mount rail receiving section 24 which extends from the cylindrical seat post securing section 16.

A pivoting opening 30 is provided in the mount rail receiving section 24 for receiving a pivoting pin 32 therein. An angle adjustment slot 34 is provided in the mount rail receiving section 24. The angle adjustment slot 34 is spaced both vertically and horizontally from the pivoting opening 30. One or more angle adjustment openings 52 (FIG. 3) are provided in the mount rail receiving section 24. In the embodiment shown, a first angle adjustment opening 52a extends through a top surface 53 of the mount rail receiving section 24 and into the angle adjustment slot 34, and a second angle adjustment opening 52b extends through a bottom surface 55 of the mount rail receiving section 24 and into the angle adjustment slot 34.

The horizontal mount rail 14 has a bicycle rack mounting section 40 and an attaching section 42 attached to the bicycle rack mounting section 40. In the illustrative embodiment shown, the bicycle rack mounting section 40 has a round cross section with the attaching section 42 extending from one side of the bicycle rack mounting section 40. However, other configurations can be used without departing from the scope of the invention. The bicycle rack mounting section 40 is configured to cooperate with a bicycle rack. The attaching section 42 has a cavity 44 for receiving the mount rail receiving section therein. The attaching section 42 receives the mount rail receiving section 24 in the cavity 44 to removably and pivotally secure the mount rail 14 to the mount rail receiving section 24 of the bicycle attachment member 12.

A pivoting opening 46 is provided in the attaching section 42 and is aligned with the pivoting opening 30 of the mount rail receiving section 24 for receiving the pivoting pin 32 therein. With the pivoting pin 32 inserted through the pivoting openings 30, 46, the mount rail 14 may be pivoted or rotated relative to the attachment member 12. An angle adjustment opening 48 is provided in the attaching section 42. As the mount rail 14 is rotated, the angle adjustment opening 48 of the attaching section 42 is moved into alignment with the angle adjustment slot 34 of the mount rail receiving section 24. An alignment pin 50 is inserted through the angle adjustment opening 48 of the attaching section 42 and the angle adjustment slot 34 of the of the mount rail receiving section 24.

The pivoting or rotation of the mounting section 40 relative to the mount rail receiving section 24 is controlled by adjustment screws 62 which are inserted into the angle adjustment openings 52. By selectively rotating the adjustment screws 62, ends of the adjustment screws 62 contact the alignment pin 50 to cause or force the mounting section 40 to rotate about the pivoting pin 32. As the adjustment screws 62 cooperate with the alignment pin 50 from both the bottom and top, the angle of the mounting section 40 can be properly set and maintained in a fixed position during operation, or can be moved as required. In the embodiment shown, the mounting section 40 may be adjusted or rotated by approximately 25 degrees, allowing a longitudinal axis of the mount rail 14 to be pivoted or rotated relative to a longitudinal axis of the attachment member 12 by approximately 25 degrees. However, other degrees of adjustment may be provided without departing from the scope of the invention.

When the bicycle is transported on the bicycle rack, the bicycle attachment member 12 and the mount rail 14 cooperate to position the mount rail 14 in a position in which the longitudinal axis of the mount rail 14 is essentially parallel to a plane which extends between the axles of the front and rear wheels of the bicycle. With the mount rail 14 properly positioned, the bicycle can be properly and safely positioned on a bicycle rack, whether the bicycle rack is a trunk mounted rack, a bumper mounted rack, a hitch mounted rack or other type of rack. In order to facilitate the proper positioning of the mount rail 14 and the bicycle, a level 60 may be provided on the mount rail 14, thereby providing a visual indication to the user that the mount rail 14 is properly positioned in a horizontal position. The level 60 operates in a known manner.

When the bicycle is not positioned on the bicycle rack, the mount rail 14 may be removed from the bicycle attachment member 12 by removing the pins 32, 50. Once the pins 32, 50 are removed, the mount rail 14 may be removed from the bicycle attachment member 12 and the bicycle. However, the bicycle attachment member 12 may remain attached to the bicycle without interfering with the operation of the bicycle, as the attachment member 12 is dimensioned to be smaller than the seat of the bicycle.

In addition, as the seat post 22 can be height adjusted, the horizontal mount rail 14 of the bicycle mount 10 can be height adjusted relative to the bicycle, ensuring that the wheels of the bicycle are safely above the ground for proper transport on the carrier or bicycle rack.

As the bicycle mount 10 cooperates and mounts to the seat post, the bicycle mount 10 allows for any type of bicycle, whether the bicycle has high top tube or cross-bar (sometimes referred to as a "man's" bike), a low or absent top tube or cross-bar (sometimes referred to as a "lady's" bike) or modified top tube or cross-bar (sometimes referred to as a "unisex" bike or a "cross bike"), to be positioned and maintained on the bicycle rack in a height appropriate, level position. The installation and use of the bicycle mount 10 is accomplished without the need of tooling.

Figure 4:
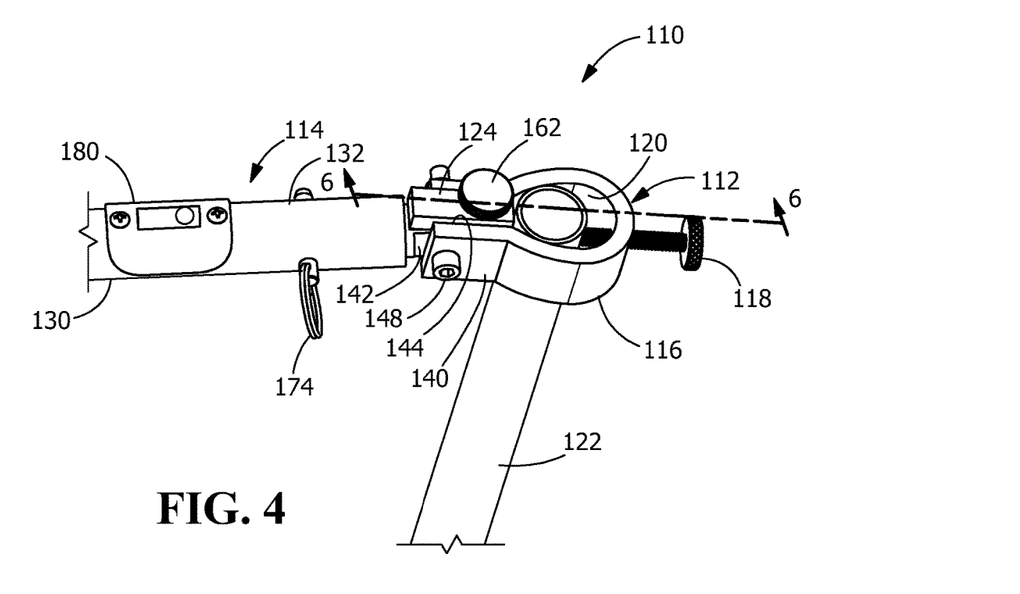
FIG. 4 is a perspective view of a second illustrative bicycle mount of the present invention mounted on a seat post of a bicycle.
Figure 5:
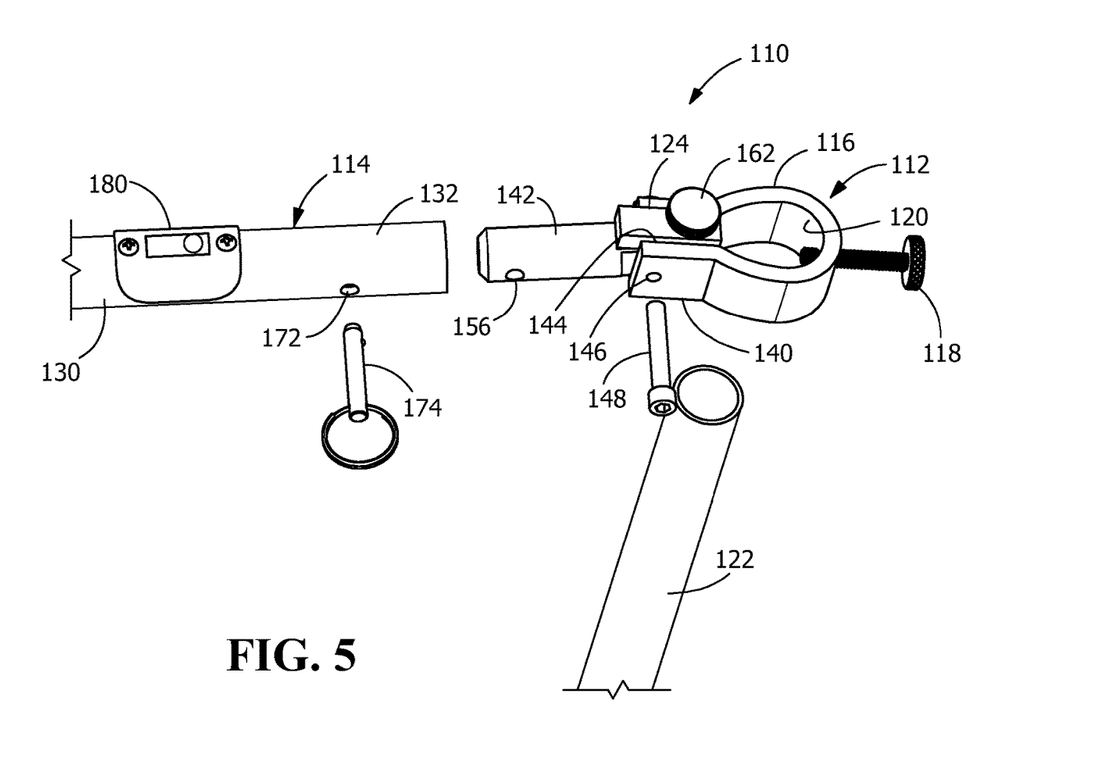
FIG. 5 is a perspective view of the bicycle mount of FIG. 4 shown with a bicycle attachment member removed from the seat post and a mount rail detached from the bicycle attachment member.
Figure 6:
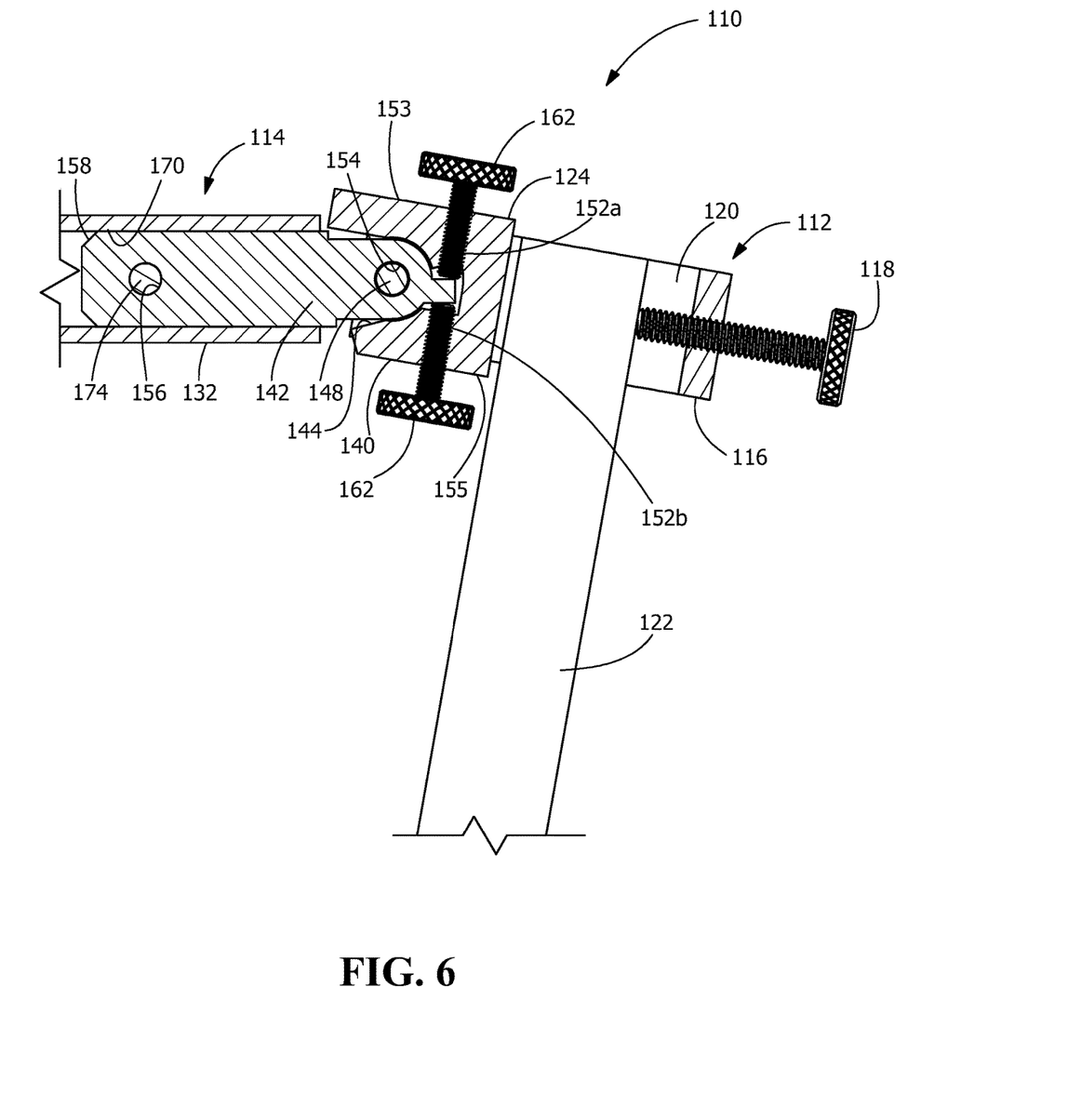
FIG. 6 is a cross-sectional view of the bicycle mount of FIG. 4 taken along line 6-6.

As shown in FIGS. 4 through 6, a second illustrative embodiment of the bicycle mount 110 has a bicycle attachment member 112 and a horizontal mount rail 114. The horizontal mount rail 114 is removably mounted to the attachment member 112. The bicycle mount 110 is configured to be used with known bicycle car racks.

In the illustrative embodiment shown in FIGS. 4 through 6, the bicycle attachment member 112 has a cylindrical seat post securing or retaining section or collar 116 with an opening 120 extending therethrough. The opening 120 is dimensioned to receive a bicycle frame or seat post 122 from a bicycle therein. In the embodiment shown, the opening 120 is dimensioned to receive a ⅞ inch to 1¼ inch diameter bicycle frame or seat post. However, the opening 120 can be configured to receive other diameter bicycle frame or seat posts without departing from the scope of the invention. In the illustrative embodiment shown, mounting hardware, such as a set screw 118 extends into the opening 120 to ensure that the bicycle frame or seat post 22 is properly maintained in the seat post securing section 116 of the opening 120. Alternatively, a tightening screw or other holding member may be used to clamp or tighten the seat post securing section 116 to the bicycle frame or seat post 122. The seat post securing section 116 has a mount rail receiving section 124 which extends from the cylindrical seat post securing section 116.

The mount rail receiving section 124 has a base section 140 and a pivoting member 142. The base section 140 extends from seat post securing section 116. In the embodiment shown, the mount rail receiving section 124 is integrally attached to the seat post securing section 116. The base section 140 has a recess 144 for receiving at least a portion of the pivoting member 142 therein. A pivoting opening 146 is positioned in the base section 140 for receiving a pivoting pin 148 therein. The pivoting opening 146 extends through the base section 140 and into the recess 144. One or more angle adjustment openings 152 (FIG. 6) are provided in the base section 140. In the embodiment shown, a first angle adjustment opening 152a extends through a top surface 153 of the base section 140 and into the recess 144, and a second angle adjustment opening 152b extends through a bottom surface 155 of the base section 140 and into the recess 144.

The pivoting member 142 has a pivoting opening 154 which extends through the pivoting member 142. The pivoting member 142 is dimensioned to be received in the recess 144 while allowing the pivoting member 142 to move relative to the recess 144 and the base section 140. A mount rail opening 156 is also provided proximate an end 158 of the pivoting member 142 which is spaced from the base section 140.

When assembled, the pivoting opening 154 of the pivoting member 142 and the pivoting opening 146 of the base section 140 are aligned and the pivoting pin 148 is inserted therein. With the pivoting pin 148 inserted through the pivoting openings 146, 154, the pivoting member 142 may be pivoted or rotated relative to the base section 140. The pivoting or rotation of the pivoting member 142 relative to the base section 140 is controlled by adjustment screws 162 which are inserted into the angle adjustment openings 152. By selectively rotating the adjustment screws 162, ends of the adjustment screws 162 contact the pivoting member 142 to cause or force the pivoting member 142 to rotate about the pivoting pin 148. As the adjustment screws 162 cooperate with the pivoting member 142 from both the bottom and top, the angle of the pivoting member 142 can be properly set and maintained in a fixed position during operation, or can be moved as required. In the embodiment shown, the pivoting member 142 may be adjusted or rotated by approximately 25 degrees, allowing a longitudinal axis of the mount rail 114 to be pivoted or rotated relative to a longitudinal axis of the attachment member 112 by approximately 25 degrees. However, other degrees of adjustment may be provided without departing from the scope of the invention.

The horizontal mount rail 114 has a bicycle rack mounting section 130 and an attaching section 132 attached to the bicycle rack mounting section 130. In the illustrative embodiment shown, the bicycle rack mounting section 130 has a round cross section with the attaching section 132 extending from one side of the bicycle rack mounting section 130, but other configurations can be used without departing from the scope of the invention. The bicycle rack mounting section 130 is configured to cooperate with a bicycle rack. The attaching section 132 cooperates with the pivoting member 142 of the mount rail receiving section 124 to removably and pivotally secure the mount rail 114 to the base section 140 of the mount rail receiving section 124 of the bicycle attachment member 112. The attaching section 132 has a cavity 170 for receiving the pivoting member 142 of the mount rail receiving section 124 therein. A mounting opening 172 extends through the attaching section.

When assembled, the mount rail opening 156 of the pivoting member 142 and the mounting opening 172 of the attaching section 132 of the mount rail 114 are aligned and mounting hardware, such as a mounting pin 174, is inserted therein, thereby attaching the mount rail 114 to the pivoting member 142 of the mount rail receiving section 124. Alternative methods of mounting the mount rail 114 to the pivoting member 142 of the mount rail receiving section 124 may be used, such as, but not limited to, detents provided on one or both of the mount rail 114 and/or the pivoting member 142. With the mount rail 114 secured to the pivoting member 142, the pivoting or rotation of the mount rail 114 relative to the base section 140 of the bicycle attachment member 112 is controlled by the adjustment screws 162.

When the bicycle is transported on the bicycle rack, the bicycle attachment member 112 and the mount rail 114 cooperate to position the mount rail 114 in a position in which the longitudinal axis of the mount rail 114 is essentially parallel to a plane which extends between the axles of the front and rear wheels of the bicycle. With the mount rail 114 properly positioned, the bicycle can be properly and safely positioned on a bicycle rack, whether the bicycle rack is a trunk mounted rack, a bumper mounted rack, a hitch mounted rack or other type of rack. In order to facilitate the proper positioning of the mount rail 114 and the bicycle, a level 180 may be provided on the mount rail 114, thereby providing a visual indication to the user that the mount rail 114 is properly positioned in a horizontal position.

When the bicycle is not positioned on the bicycle rack, the mount rail 114 may be removed from the bicycle attachment member 112 by removing the mounting pin 174. However, the bicycle attachment member 112 may remain attached to the bicycle without interfering with the operation of the bicycle, as the attachment member 112 is dimensioned to be smaller than the seat of the bicycle.

In addition, as the seat post 122 can be height adjusted, the horizontal mount rail 114 of the bicycle mount 110 can be height adjusted relative to the bicycle, ensuring that the wheels of the bicycle are safely above the ground for proper transport on the carrier or bicycle rack.

As the bicycle mount 110 cooperates and mounts to the seat post, the bicycle mount 110 allows for any type of bicycle, whether the bicycle has high top tube or cross-bar (sometimes referred to as a "man's" bike), a low or absent top tube or cross-bar (sometimes referred to as a "lady's" bike) or modified top tube or cross-bar (sometimes referred to as a "unisex" bike or a "cross bike"), to be positioned and maintained on the bicycle rack in a height appropriate, level position. The installation and use of the bicycle mount 10 is accomplished without the need of tooling.

Figure 7:
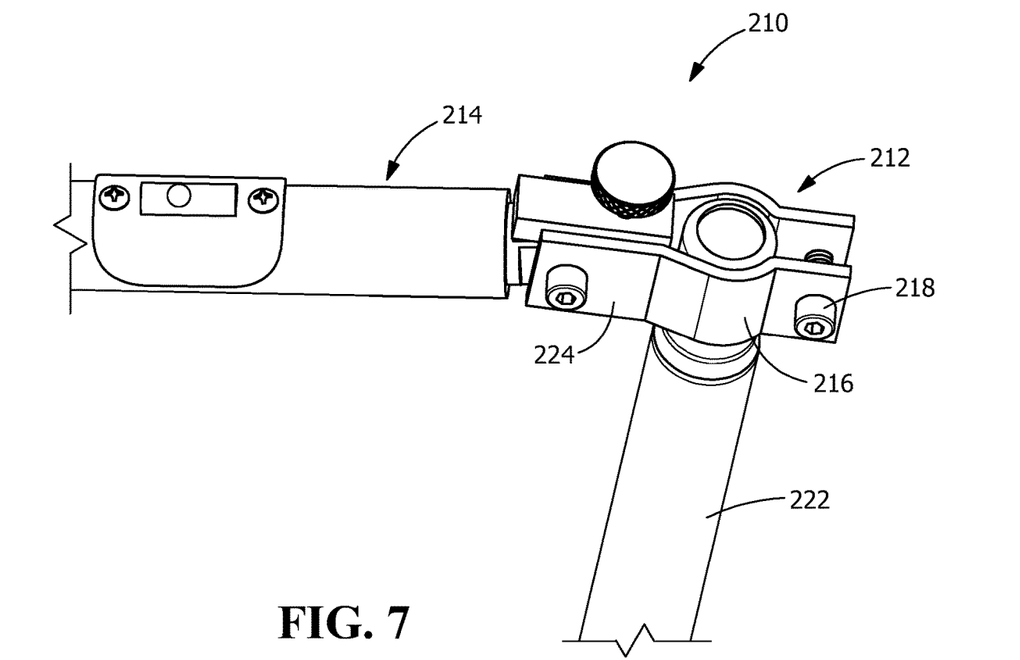
FIG. 7 is a perspective view of a third illustrative bicycle mount of the present invention mounted on a seat post of a bicycle.

Other embodiments of the bicycle mount and other mounting members may be used without departing from the scope of the invention. For example, FIG. 7 illustrates an alternative bicycle mount 210 which has a bicycle attachment member 212 and a horizontal mount rail 214. The bicycle attachment member 212 has a seat post securing section 216 with a mount rail receiving section 224 extending from the seat post securing section 216. The seat post securing section 216 has a split collar to facilitate attachment to the bicycle post 222. In this embodiment, the mounting hardware 218 causes the split collar to clamp around the bicycle frame or seat post 222 when the hardware 218 is tightened, thereby securing the bicycle attachment member 212 to the bicycle frame or seat post 222. The mount rail receiving section 224 extends from the seat post securing section 216. The mount rail receiving section 224 and the mount rail 214 operate in a similar manner as previously described with reference to FIGS. 4 through 6.

Figure 8:
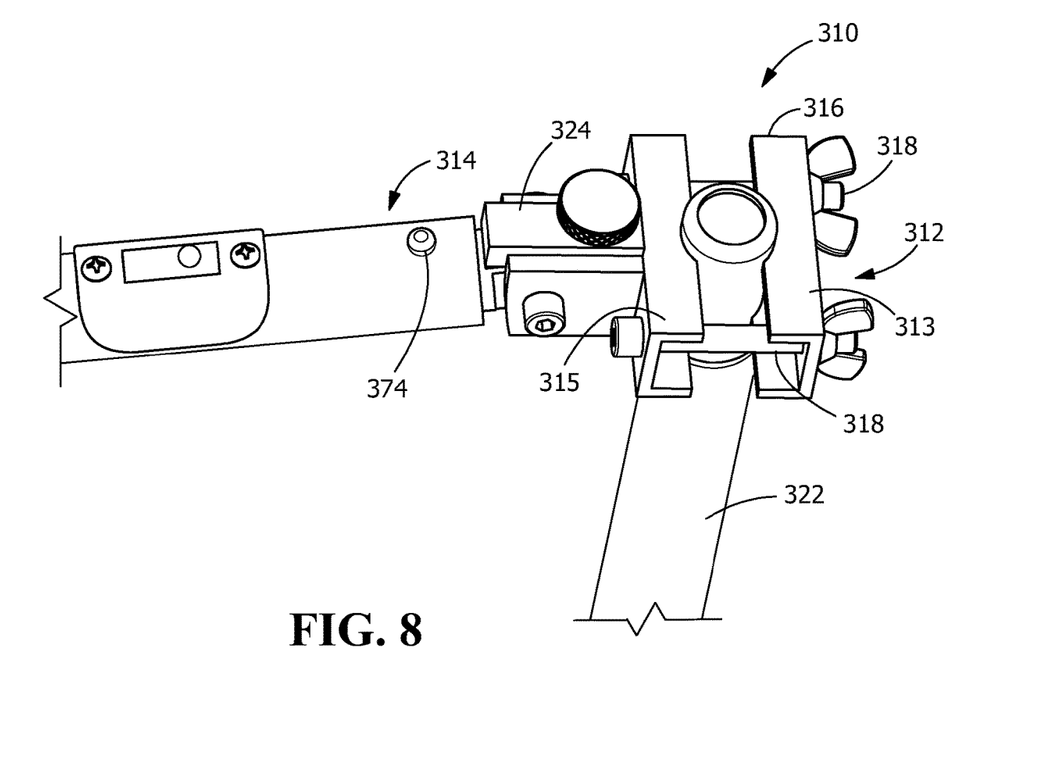
FIG. 8 is a perspective view of a fourth illustrative bicycle mount of the present invention mounted on a seat post of a bicycle.

FIG. 8 illustrates an alternative bicycle mount 310 which has a bicycle attachment member 312 and a horizontal mount rail 314. The bicycle attachment member 312 has a seat post securing section 316 with a mount rail receiving section 324 extending from the seat post securing section 316. The seat post securing section 316 is a two piece member through which the bicycle frame or seat post 322 extends. A first mounting member 313 and a second mounting member 315 are clamped to the bicycle frame or seat post 322 by two mounting bolts 318. The mount rail receiving section 324 extends from the second mounting member 315. The mount rail receiving section 324 and the mount rail 314 operate in a similar manner as previously described with reference to FIGS. 4 through 6. In the embodiment, the mounting pin is replaced with a spring loaded detent 374.

Bicycles typically weigh anywhere from approximately 15 pounds to approximately 40 pounds. However, heavier bikes, of approximately 60 or more pounds, are known. The bicycle mounts 10 as shown and described herein are configured to accommodate most bicycle, regardless of weight.

While the invention has been described with reference to a preferred embodiment, it will be understood by those skilled in the art that various changes may be made and equivalents may be substituted for elements thereof without departing from the spirit and scope of the invention as defined in the accompanying claims. In particular, it will be clear to those skilled in the art that the present invention may be embodied in other specific forms, structures, arrangements, proportions, sizes, and with other elements, materials, and components, without departing from the spirit or essential characteristics thereof. One skilled in the art will appreciate that the invention may be used with many modifications of structure, arrangement, proportions, sizes, materials and components and otherwise used in the practice of the invention, which are particularly adapted to specific environments and operative requirements without departing from the principles of the present invention. The presently disclosed embodiments are therefore to be considered in all respects as illustrative and not restrictive, the scope of the invention being defined by the appended claims, and not limited to the foregoing description or embodiments.

The invention claimed is:

1. A bicycle mount device for mounting a bicycle to a bicycle rack of a vehicle, the device comprising:

an attachment member for attaching the device to a seat post or frame of the bicycle, the attachment member having a securing section and a mount rail receiving section, the securing section securing the attachment member to the seat post or frame, the mount rail receiving section having at least one pivot adjustment member;

a detachable mount rail having a bicycle rack mounting section and an attaching section, the mounting section configured to cooperate with a bicycle rack, the attaching section cooperating with the mount rail receiving section to removably and pivotally secure the detachable mount rail to the mount rail receiving section of the attachment member, the attaching section having a pivot point and a pivot adjustment projection spaced from the pivot point;

the at least one pivot adjustment member cooperates with the pivot adjustment projection to allow the detachable mount rail to pivot relative to the attachment member to position a longitudinal axis of the detachable mount rail parallel to the ground and parallel to the plane extending between an axle of a front wheel of the bicycle and an axle of a rear wheel of the bicycle, the detachable mount rail configured to fully support the weight of the bicycle with no additional support and maintain the bicycle in level position on the bicycle with the wheels suspended from the ground during transport with no additional support;

wherein when the bicycle is not positioned on the bicycle rack, the detachable mount rail may be removed from the attachment member while the attachment member remains attached to the bicycle without interfering with the operation of the bicycle.

2. The bicycle mount device as recited in claim 1, wherein the pivot adjustment projection is a detent pin inserted through an opening in the mount rail receiving section and an opening in the attaching section, the detent pin mounts the attaching section to the mount rail receiving section, allowing the attaching section and the mount rail to pivot relative to the detent pin and the mount rail receiving section of the attachment member.

3. The bicycle mount device as recited in claim 2, wherein a second detent pin is inserted through an angle adjustment opening in the mount rail receiving section and an angle adjustment opening in the attaching section, the second detent pin mounts the attaching section at a fixed position relative the mount rail receiving section.

4. The bicycle mount device as recited in claim 1, wherein the attaching section has a cavity for receiving a portion of the mount rail receiving section therein, the at least one pivot adjustment member is provided in the portion of the mounting rail receiving section.

5. The bicycle mount device as recited in claim 4, wherein the pivot adjustment projection is a detent pin inserted through an opening in the portion of the mount rail receiving section and an opening in the attaching section, the detent pin mounts the attaching section to the portion of the mount rail receiving section.

6. The bicycle mount device as recited in claim 5, wherein the at least one pivot adjustment member is at least one set screw which engages the pivot adjustment projection to allow the pivot adjustment projection, the attaching section and the mount rail to be angularly adjusted relative to the attachment member.

7. The bicycle mount device as recited in claim 6, wherein the at least one set screw is two set screws, with one respective set screw cooperating with an upper surface of the pivot adjustment projection and the other respective set screw cooperating with a lower surface of the pivot adjustment projection.

8. The bicycle mount device as recited in claim 4, wherein a spring loaded detent is provided on the portion of the mount rail receiving section and a receiving opening is provided in the attaching section, the spring loaded detent cooperates with the receiving opening to releasably mount the attaching section to the mount rail receiving section.

9. The bicycle mount device as recited in claim 1, wherein the securing section of the attachment member has a clamping mechanism which receives the seat post or frame therein.

10. The bicycle mount device as recited in claim 9, wherein the clamping mechanism is a collar with an opening extending therethrough for receiving the seat post or frame.

11. The bicycle mount device as recited in claim 10, wherein the clamping mechanism has at least one set screw to allow the clamping mechanism to mount to seat posts or frames of different diameters.

12. The bicycle mount device as recited in claim 9, wherein the clamping mechanism is a split collar with tightening hardware extending therebetween for securing the attachment member to the seat post or frame.

13. The bicycle mount device as recited in claim 9, wherein the clamping mechanism has two pieces which are tightened and secured to the seat post or frame by tightening hardware.

14. The bicycle mount device as recited in claim 1 wherein the mount rail has a level positioned thereon.

15. A method for mounting a bicycle to a bicycle rack on a vehicle, the method comprising:
providing a bicycle mount device according to claim 1;
securing the attachment member to a seat post or frame of a bicycle;
removably attaching the mount rail to the attachment member;
adjusting the mount rail relative to the attachment member such that the mount rail is approximately horizontally level;
mounting the mount rail and secured bicycle to the bicycle rack such that an axis which extends through center points of both wheels of the bicycle is essentially parallel to a plane which extends through center points of wheels of the vehicle.

16. The method as recited in claim 15, wherein a set screw is provided on the attachment member, the set screw cooperating with the mount rail to angularly adjust the mount rail relative to the attachment member.

17. The method as recited in claim 15, wherein the mount rail has a level to assist in the adjusting the mount rail relative to the attachment member such that the mount rail is approximately horizontally level.

18. The method as recited in claim 15, wherein the mount rail is removably attached to the attachment member by a spring loaded detent.

19. The method as recited in claim 15, wherein the mount rail is removably attached to the attachment member by one or more detent pins.

20. The method as recited in claim 15, wherein the attachment member has mounting hardware which allows the attachment member to be secured to seat posts or frames of different diameters.

* * * * *